United States Patent Office
3,453,559
Patented July 1, 1969

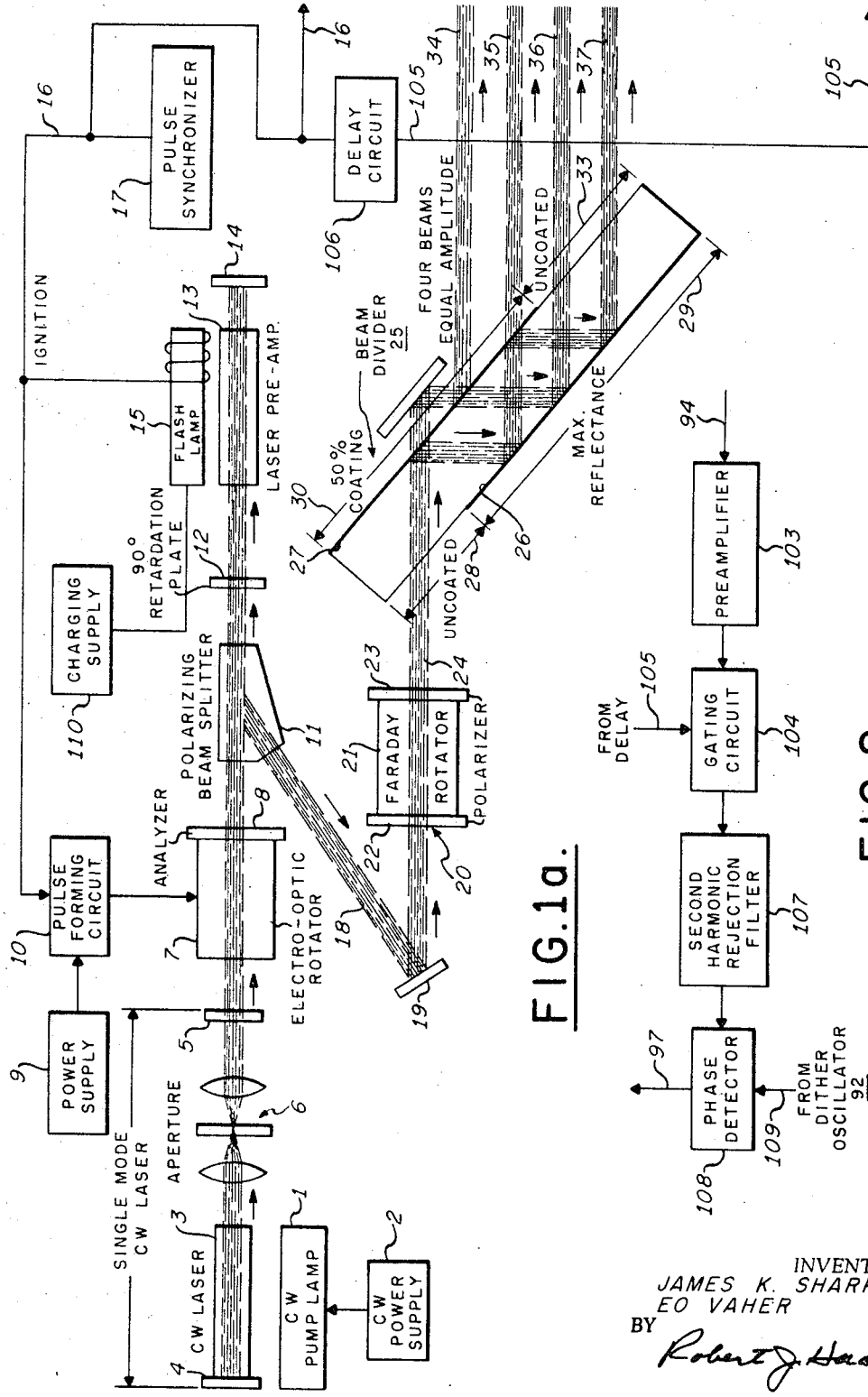

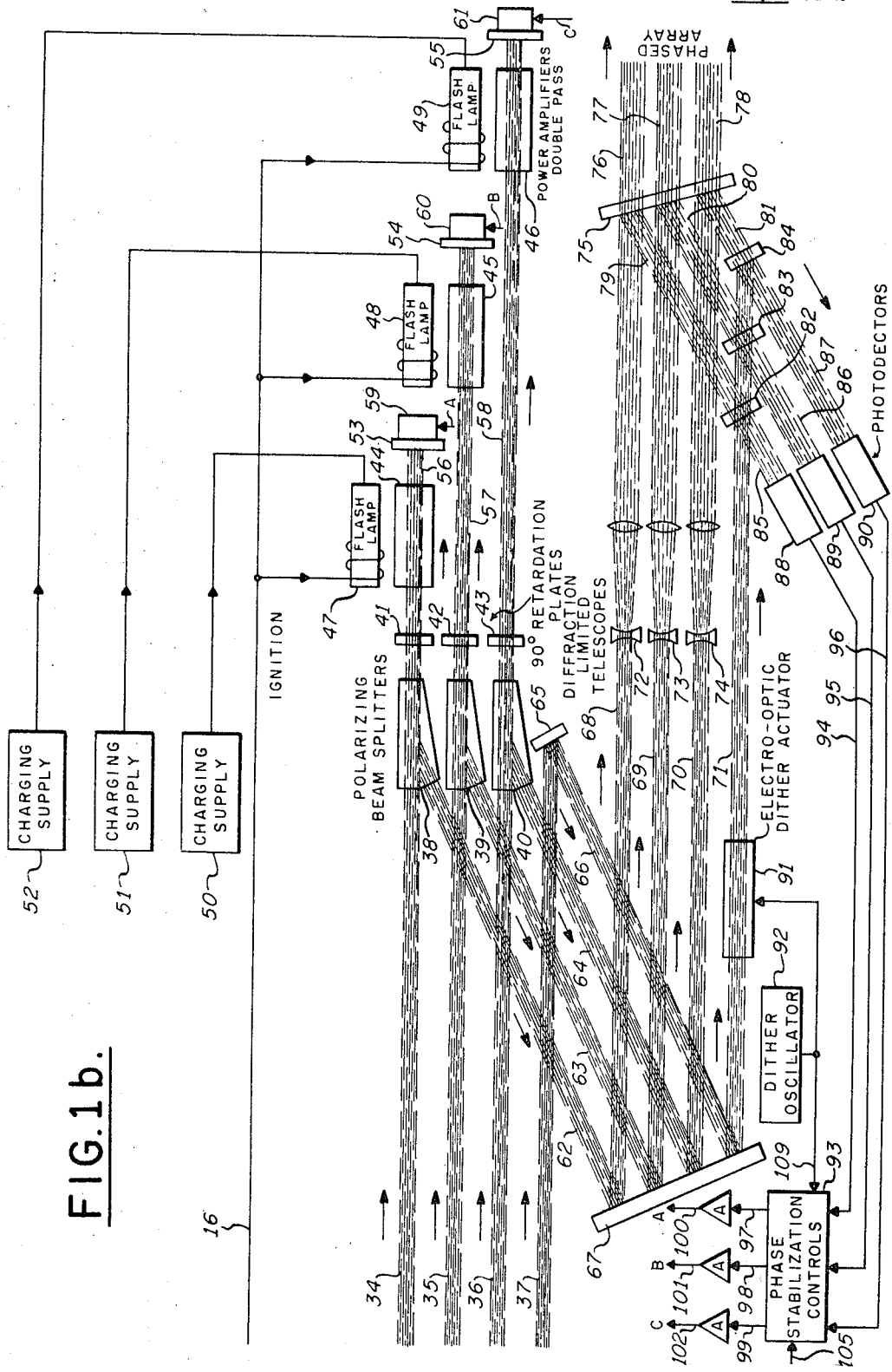

3,453,559
MULTIPLE LASER AMPLIFIER PHASE
CONTROL SYSTEM
James K. Sharp, Huntington, and Eo Vaher, Huntington Station, N.Y., assignors to Sperry Rand Corporation, a corporation of Delaware
Filed Apr. 1, 1966, Ser. No. 539,574
Int. Cl. H01s 3/02
U.S. Cl. 331—94.5          8 Claims The present invention generally relates to phase control systems and, more particularly, concerns a system for maintaining a predetermined phase relationship between an amplified plurality of laser beams.

At the present state of the art, one of the primary limitations in high power coherent light applications is the maximum average power output of lasers and laser amplifiers. One solution to the problem is the use of a multiplicity of laser devices whose total combined output power meets the demands of a given application whereas the maximum power available from a single laser device would fall far short. As frequently happens, however, the solution to one problem engenders a new problem. The optimum use of the multiplicity of laser devices requires, in turn, that the individual beams issuing therefrom be maintained in a predetermined phase relationship so that maximum energy may be concentrated at a predetermined far-field location. A phased-array laser radar is a typical example of an application wherein the combined power output from a multiplicity of laser sources is desired. The maximum combined power results from the in-phase summation of the individual laser beams at a position in space where the beam energies arrive in additive phase.

The ordinary difficulty of maintaining predetermined phase relationships between multiple signals is aggravated in cases where the signals are derived from pulsed laser amplifiers. It has been observed that severe acoustical vibrations are established shortly after the occurrence of the pulse which pumps each laser amplifier. Optical components, such as positionable mirrors, are disturbed from their calibrated positions by the acoustical energy and come to rest at arbitrary and random orientations after the termination of the vibrations. Said random orientations, if unchecked, would cause corresponding random phases between the plurality of pulse amplified laser beams upon the occurrence of the next succeeding modulating pulse. The relatively random and arbitrary phase relationships would defeat the purpose of the system which is to produce a composite laser beam having a resultant output far beyond the power limitations of the individual laser devices.

One object of the present invention is to provide a plurality of laser beams having predetermined phase relationships.

Another object is to provide a plurality of simultaneously pulsed laser beams having the same predetermined phase relationships upon the occurrence of each pulse of a successive series of pulses.

A further object is to provide a phase control system for a plurality of successively pulsed laser beams which system is operative solely during the interval between the successive pulses.

An additional object is to provide a plurality of simultaneously pulsed laser beams having the same predetermined phase relationship relative to a reference laser beam following the occurrence of each pulse of a successive series of pulses.

These and other objects of the present invention, as will appear from a reading of the following specification, are achieved in the disclosed phased-array laser radar transmitter embodiment. It is required that each of the beams radiated from the array be maintained in a predetermined phase relationship relative to the phase of a reference beam so that the composite beam formed by the array is of maximum amplitude at a predetermined position in the far-field pattern. The system comprises a continuous-wave primary laser oscillator whose output beam is pulsed upon passing through an electro-optical modulator. The modulated beam, in turn, is passed through a pulsed laser preamplifier and then, via beam splitting means, into a plurality of paralleled pulsed laser amplifier channels. The individual laser preamplifier and amplifiers are similar to the continuous laser wave oscillator in structure except for the absence of a resonant cavity, i.e., the laser amplifiers are not equipped with end mirrors for defining resonant cavities.

Each of a successive series of modulating pulses is applied to the electro-optical modulator, to the laser preamplifier and to the individual laser amplifiers. Severe acoustical vibrations build up in the system after a short delay following each occurrence of the modulating pulses. It has been found, however, that the vibrations do not grow to objectionable intensity for at least hundreds of microseconds measured from the initiation of the modulating pulse. The delay is sufficient to permit the generation, amplification and transmission of the desired coherent laser energy through the entire system before the system is phase-disturbed by objectionable levels of acoustical energy. Although the vibrations subside in time to permit useful pulse repetition rates, the optical components of the system assume arbitrary final rest positions which cause arbitrary differences in the lengths of the individual amplifier channels and, hence, arbitrary differences in the phase of the next laser beams issuing therefrom in response to the next modulating pulse.

In accordance with the present invention, a low amplitude "pilot" laser beam is allowed to propagate through the system during the interval between the modulating pulses. The pilot beam is derived from the continuous-wave primary laser and is processed through the system in the same manner as the main laser pulse. The phase of the pilot beam in each of the plurality of amplifier channels is determined by the arbitrary path length thereof resulting from the acoustical vibrations associated with the immediately preceding modulating pulse. The pilot beam in each of the channels is phase compared to a reference pilot beam to provide an error signal which is applied to a respective phase adjusting servo to restore the desired phase relationship immediately prior to the occurrence of the next succeeding modulating pulse. Means are provided to allow the servos to function only during the time interval between the termination of the accoustical vibrations resulting from a given modulating pulse and the initiation of the next succeeding modulating pulse.

For a more complete understanding of the invention, reference should be had to the following specification and to the following figures of which:

FIGURES 1a and 1b together comprise a simplified block diagram of a phased array laser transmitter embodiment of the present invention; and FIGURE 2 is a simplified block diagram of one of the phase stabilization controls utilized in the embodiment of FIGURES 1a and 1b.

Referring to FIGURE 1a, pump lamp 1 is continuously energized by power supply 2. Radiation from lamp 1 excites laser crystal 3 for continuous operation. The laser resonant cavity is defined by end mirrors 4 and 5, mirror 4 being affixed to one end of laser crystal 3. In order to ensure single transverse mode or uniphase output from the laser, aperturing optics 6 are inserted within the resonant cavity to permit the buildup and maintenance of substantially a single transverse linearly polarized oscillatory mode. The linearly polarized beam issuing from end mirror 5 is directed through a conventional electro-optic rotator 7 equipped with analyzer plate 8. Rotator 7 (e.g. wave plate) is energized by power supply 9 via pulse-forming circuit 10. Analyzer plate 8 is oriented relative to the direction of the input linearly polarized energy so that said energy is approximately cut off, allowing only a relatively low amplitude linearly polarized "pilot" beam to issue from analyzer plate 8 in the absence of any pulse from circuit 10. Each pulse from circuit 10 energizes rotator 7 so that the input linearly polarized energy is rotated through that angle which permits maximum transmission through analyzer plate 8. A suitable rotator is described with reference to FIGURE 2 of the paper, "A Fast, Digital-Indexed Light Deflector," by Kulcke et al., beginning on page 64 of the January 1964 IBM Journal of Research and Development. In summary, rotator 7 permits only a small amplitude or "pilot" beam to pass through it during intervals between successive pulses from circuit 10 and permits the full amplitude energy to pass through during the time interval of each of the successive pulses from circuit 10. In a typical instance, the pulses from circuit 10 may be of 10 microseconds duration with a pulse repetition interval of the order of seconds.

The pulsed linearly polarized laser energy at the output of analyzer 8 is directed through polarizing beam splitter 11 and into 90 degree retardation plate 12. A Glan-Thompson prism is suitable for use as beam splitter 11. The orthogonal components of the incident linearly polarized energy at plate 12 are phase delayed relative to each other by 180 degrees inasmuch as one component suffers a 90 degree phase delay relative to the other component upon each of two traversals through plate 12. Following the first traversal, the energy propagates through laser preamplifier 13 and is reflected by end mirror 14 for a second pass through amplifier 13 and a second traversal of retardation plate 12. Preamplifier 13 is activated by flash lamp 15 which, in turn, is energized by supply 110. The discharges of flash lamp 15 are triggered by the successive pulses appearing on line 16 at the output of pulse synchronizer 17. The pulses on line 16 also trigger pulse forming circuit 10 so that rotator 7 is actuated simultaneously with preamplifier 13.

As a result of the two successive passes of the incident linearly polarized energy through retardation plate 12, the polarization thereof is rotated by 90 degrees whereby it is directed to path 18 by the action of beam splitter 11. The beam is redirected by mirror 19 through isolator 20 comprising Faraday rotator 21 and polarizer plates 22 and 23. The beam reflected from mirror 19 passes with full amplitude through polarizer 22, is rotated 45 degrees by rotator 21 and then passes through polarizer 23. It should be noted that energy travelling along path 24 at the output of isolator 20 in a direction opposite to the direction of propagation of the incident energy and polarized in the same direction as the incident energy will pass through polarizer 23, be rotated 45 degrees in a sense opposite to the 45 degree rotation of the incident energy and be blocked by polarizer 22. Thus, isolator 20 permits energy to propagate through input polarizer 22 to output polarizer 23 but not vice versa.

The beam exiting from polarizer 23 is directed into beam divider 25 which provides four equal amplitude output beams by the division of the input beam on path 24. Beam divider 25 comprises two parallel surfaces 26 and 27 which are arranged to have respective portions through which light can pass without any reflection, with partial reflection and with total reflection. Portion 28 is uncoated so that the incident beam passes through without any reflection. Portion 29 is coated for total reflection to prevent the beam inside divider 25 from exiting through surface 26. Surface 27 is divided into two portions. Portion 30 is coated for fifty percent reflection of incident light, whereas portion 33 is uncoated so that incident light suffers no reflection. In the example given, the amplitude of each of the four output beams 34, 35, 36 and 37 is the same fraction of the amplitude of the input beam.

Three of the output beams are directed by respective polarizing beam splitters 38, 39 and 40 (FIG. 1b) and respective 90 degree retardation plates 41, 42 and 43 into respective laser amplifiers 44, 45 and 46. Output beam 37, which is used for reference purposes to be described later, is not amplified. Amplifiers 44, 45 and 46 are actuated simultaneously with laser preamplifier 13 and rotator 7 by the trigger pulses on line 16. The laser amplifiers are energized in a manner similar to the energization of preamplifier 13 by respective pulsed flash lamps 47, 48 and 49 and their associated charging supplies 50, 51 and 52. It will be noted that the linearly polarized energy at the output of each of beam splitters 38, 39 and 40 passes through a respective 90 degree retardation plate and amplifier twice as in the case previously described with reference to beam splitter 11, retardation plate 12 and laser preamplifier 13. Each of the laser amplifiers 44, 45 and 46 is distinguished from laser preamplifier 13 in that end mirrors 53, 54 and 55 are individually positionable whereas end mirror 14 associated with preamplifier 13 is fixed. The independent movement of mirrors 53, 54 and 55 in a direction longitudinally along beam paths 56, 57 and 58 permits independent path length adjustment for the respective beams from divider 29. The independent path length control, in turn, permits independent electrical phase angle control of said three beams. Each of end mirrors 53, 54 and 55 is positioned in response to a control signal applied to a respective one of piezo-electric crystals 59, 60 and 61 to which the mirrors are fixed.

Neglecting for the moment the operation of the piezo-electric phase stabilizing crystals 59, 60 and 61, the reflected beams return through retardation plates 41, 42 and 43 and are then directed by polarizing beam splitters 38, 39 and 40 along respective paths 62, 63 and 64. The reference beam propagating along path 37 at the output of divider 25 is redirected by mirror 65 along path 66. The energy propagating along paths 62, 63, 64 and 66 is redirected by mirror 67 along final output paths 68, 69, 70 and 71. Diffraction limited telescopes 72, 73 and 74 are placed within each of paths 68, 69 and 70 so as to optimize the individual beam dimensions and relative spacing to achieve substantially a single high energy lobe in the far-field pattern produced by the radiated beams.

Partially reflecting mirror 75 permits the major portion of the energy to pass through to outputs 76, 77 and 78 while reflecting a small equal fraction of the incident light along paths 79, 80 and 81. Said reflected light passes through partially reflecting mirrors 82, 83 and 84 along with portions of the reference energy propagating along path 71. Thus, a beam pair comprising a portion of a respective output beam and a portion of the reference energy propagates along each of paths 85, 86 and 87 and is detected in a respective photodetector 88, 89 and 90. The reflectivities and transmissivities of the mirrors are adjusted so that substantially equal amplitude beams impinge on the respective photodetectors. For example, assuming that the amplitude of the reference beam on path 71 is five times greater than the output beam samples on paths 79, 80 and 81, equal amplitude beam pairs result when the reflectivities (R) and transmissivities (T) of the respective mirrors are as indicated in the following table:

| Mirror | Reflectivity, percent | Transmissivity, percent |
|---|---|---|
| 82 | 16.7 | 83.3 |
| 83 | 18.8 | 81.2 |
| 84 | 27.0 | 73.0 |

Each photodetector produces a maximum output when the two equal amplitude beams comprising the respective incident beam pair are in phase with each other; smaller outputs are produced for other phase relationships.

A feature of the present invention is that only one photodetector is utilized for the reference beam and a given output beam sample. That is, the individual beams are not applied to separate photodetectors whose outputs are substractively combined. The use of a single photodetector avoids the problem of gain stabilizing the photodetectors in order that their subtractively combined outputs would reliably represent the phase relationship between the incident beams. The use of a single photodetector for each beam pair, however, carries with it the inability to determine the sense of the phase relationship between the incident beams. For example, the same finite output would be produced by a given photodetector for two incident beams having a relative phase relationship of +2 degrees or −2 degrees. The present invention provides for the elimination of such phase ambiguity by the introduction of a relatively high frequency phase "dither" in the reference beam channel. The dither causes the phase of the reference beam to change recurrently within a small range and at a high rate. In a typical case, the phase relationship between the two beams impinging on a given photodetector is swept continuously and rapidly ±2° about its quiescent value.

The dither is introduced by electro-optic dither actuator 91 which is positioned in the reference beam path 71. Actuator 91 may comprise a crystal of potassium dihydrogen phosphate or some other electro-optical material whose index of refraction is subjected to change upon application of a control voltage in a known manner. The control voltage is derived from dither oscillator 92 operating at some convenient frequency such as, for example, 100 kc. The signal output of oscillator 92 also is directed to phase stabilization controls 93 along with the output signals on lines 94, 95 and 96 from the photodetectors. In brief, phase stabilization controls 93 phase compare the dither oscillator signal with the dither modulation of each of the photodetector output signals to produce respective control signals on lines 97, 98 and 99 representing the phase displacement between the reference signal and the respective one of the radiated beams exiting from ports 76, 77 and 78. The control signals are applied via driver amplifiers 100, 101 and 102 to the respective piezo-electric phase stabilizer crystals 59, 60 and 61 whereby the phases of each of the radiated beams are brought into the same relationship with the phase of the reference beam and the phases of the radiated beams are stabilized relative to each other.

In more detail, the dither-phase modulated reference beam and the output beam sample applied to a given photodetector are coherently added together to produce a respective output signal, such as the output signal on line 94. Said output signal has a component at the dither frequency whose amplitude is a measure of the phase disagreement between the reference beam and the output beam sample of path 85. The phase of the photodetector output signal component, relative to the phase of the dither oscillator signal, represents the sense of said phase disagreement.

Referring to FIGURE 2, the photodetector output signal on line 94 is applied via preamplifier 103 to gating circuit 104. For approximately 100 to 200 milliseconds after each pulse applied to laser preamplifier 13 and laser amplifiers 44, 45 and 46, the amplifier system is subjected to severe vibrations. In order that the phase correcting servo system be protected from overload error signals accompanying said vibrations, normally non-conducting gating circuit 104 is provided. Circuit 104 is rendered conductive only for a period of time sufficient to complete the necessary phase correction action immediately prior to each of the successive laser amplifier pulses. It is not necessary that the phase correcting servo system be activated during the occurrence of each laser amplifier pulse because the phase adjustment made just prior to each pulse remains unchanged during each pulse due to the time lag before the start of the acoustical vibrations following each pulse. Gating circuit 104 is rendered conductive upon the occurrence of each pulse on line 105 at the output of delay circuit 106 of FIGURE 1a. The pulse delay introduced by delay circuit 106, relative to the occurrence of the input pulses on line 16, is in excess of the time required for the diminution of mechanical vibrations and less than the period of said input pulses.

The gated signal at the output of circuit 104 is applied via second harmonic rejection filter 107 to phase detector 108. Filter 107 eliminates the second harmonic component of the photodetector output signal on line 94, which component is likely to be substantially stronger than the desired fundamental component at dither frequency. The dither frequency is phase compared in detector 108 with the dither oscillator signal on line 109, which is the output of oscillator 92. Detector 108 produces a control signal on output line 97 having an amplitude representing the amount of phase disagreement between the reference beam and the output beam sample at photodetector 88 and a polarity representing the sense of said disagreement. Said control signal is applied via driver amplifier 100 to the respective phase stabilizer crystal 59. It should be understood that an additional phase stabilization control similar to the one described with reference to FIGURE 2 is provided for each of the two additional detectors 89 and 90 for the control of their associated phase stabilizer crystals 60 and 61.

While the invention has been described in its preferred embodiments, it is to be understood that the words which have been used are words of description rather than limitation and that changes may be made without departing from the true scope and spirit of the invention in its broader aspects.

What is claimed is:

1. In a system comprising a plurality of channels, each channel including a laser amplifier, means for establishing a predetermined phase relationship between output beams from said channels, said means comprising:
   a source of first coherent light irradiating each of said channels,
   a source of second coherent light having the same frequency as said first coherent light,
   a plurality of photodetector means, each said photodetector means receiving a portion of said first coherent light from a respective channel and a portion of said second coherent light to provide a control signal representing the phase relationship therebetween, and
   first phase control means in each of said channels for varying the optical path length of each channel in response to a respective control signal, each said control signal being applied to a respective one of said phase control means.

2. Means for establishing a predetermined phase relationship between output beams as defined in claim 1 wherein each said control signal is applied to a respective one of said phase control means via a respective phase comparison means and further including:
   second phase control means for varying the phase of said second coherent light in response to dither oscillations,
   a source of said dither oscillations, and
   a plurality of phase comparison means, each said phase comparison means receiving a respective control signal and said dither oscillations for producing an output signal representing the phase relationship therebetween,
      each said output signal being applied to a respective one of said first phase control means in lieu of said control signal, and said dither oscillations being applied to said second phase control means.

3. Means for establishing a predetermined phase relationship between output beams as defined in claim 1 and further including:
   a plurality of gating means, each said gating means applying each said control signal to a respective one of said first phase control means when said gating means is rendered conductive,
   means for producing a recurrent series of pulses, said pulses being applied to each of said laser amplifiers, and
   pulse delay means applying said pulses to each said gating means for rendering each said gating means conductive, said delay means introducing a delay in excess of the time required for the substantial diminution of vibrations following each of said pulses and less than the period of said pulses.

4. Means for establishing a predetermined phase relationship between output beams as defined in claim 3 wherein each said gating means is coupled in series circuit with a phase comparison means and further including:
   second phase control means for varying the phase of said second coherent light in response to dither oscillations, and
   a source of dither oscillations,
   each said phase comparison means receiving a respective control signal and said dither oscillations for producing an output signal representing the phase relationship therebetween,
   each said output signal being applied to a respective one of said first phase control means in lieu of said control signal, and
   said dither oscillations being applied to said second phase control means.

5. Means for establishing a predetermined phase relationship between output beams as defined in claim 1 and further including:
   a modulator coupled between said source of first coherent light and each of said channels for applying said first coherent light thereto, said modulator passing maximum light when pulsed and passing minimum light when not pulsed, and
   means for producing a recurrent series of pulses, said pulses being applied to each of said laser amplifiers and to said modulator.

6. Means for establishing a predetermined phase relationship between output beams as defined in claim 5 wherein said source of second coherent light includes said source of first coherent light whereby said second coherent light is derived from said first coherent light.

7. Means for establishing a predetermined phase relationship between output beams as defined in claim 3 and further including:
   a modulator coupled between said source of first coherent light and each of said channels for applying said first coherent light thereto, said modulator passing maximum light when pulsed and passing minimum light when not pulsed,
   said pulses being applied to said modulator.

8. Means for establishing a predetermined phase relationship between output beams as defined in claim 4 and further including:
   a modulator coupled between said source of first coherent light and each of said channels for applying said first coherent light thereto, said modulator passing maximum light when pulsed and passing minimum light when not pulsed, said pulses being applied to said modulator.

References Cited

UNITED STATES PATENTS 3,361,990   1/1968   Gordon et al. _____ 331—94.5

OTHER REFERENCES

Electronics, vol. 38, Feb. 22, 1965, pp. 45–46.

ROY LAKE, *Primary Examiner.*

S. H. GRIMM, *Assistant Examiner.*

U.S. Cl. X.R.

250—199; 330—4.3